United States Patent
Hämäläinen et al.

(10) Patent No.: US 10,231,246 B2
(45) Date of Patent: Mar. 12, 2019

(54) RADIO RESOURCE ALLOCATION AND RADIO SYSTEM

(75) Inventors: Jyri Hämäläinen, Oulu (FI); Esa Tiirola, Kempele (FI); Kari Horneman, Oulu (FI); Jari Hulkkonen, Oulu (FI); Kari Pajukoski, Oulu (FI); Pasi Kinnunen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 965 days.

(21) Appl. No.: 11/979,504

(22) Filed: Nov. 5, 2007

(65) Prior Publication Data

US 2008/0132242 A1    Jun. 5, 2008

(30) Foreign Application Priority Data

Nov. 6, 2006 (FI) .................................. 20065698

(51) Int. Cl.
*H04W 72/00* (2009.01)
*H04W 72/08* (2009.01)
(Continued)

(52) U.S. Cl.
CPC ........ *H04W 72/082* (2013.01); *H04B 17/345* (2015.01); *H04B 17/382* (2015.01)

(58) Field of Classification Search
CPC . H04L 1/0026; H04L 2012/5607; H04L 1/06; H04W 16/14; H04W 72/04;
(Continued)

(56) References Cited

U.S. PATENT DOCUMENTS 5,915,221 A    6/1999 Sawyer et al.
6,028,851 A    2/2000 Persson et al.
(Continued)

FOREIGN PATENT DOCUMENTS

EP    0680168 A2    11/1995
EP    0 841 826 A2    5/1998
(Continued)

OTHER PUBLICATIONS

Nokia Corporation, "UL Interference Control Considerations", 3GPP TSG-RAN WG1 Meeting #42, London, U.K., Aug. 29-Sep. 2, 2005, a total of 3 pages.
(Continued)

*Primary Examiner* — Stephen M D Agosta
(74) *Attorney, Agent, or Firm* — Squire Patton Boggs (US) LLP

(57) ABSTRACT

There is provided a radio system, having a receiver for receiving cell measurement data with respect to an own cell and adjacent cells of each user terminal of a plurality of cells of the radio system; a calculation unit for comparing resulting interference values of different user terminal combinations within the same frequency-time resource group of the radio system on the basis of the cell measurement data, the frequency-time resource group including user terminals of more than one cell; and a processing unit for controlling resource allocation in at least part of the frequency-time resource groups on the basis of the comparison.

19 Claims, 5 Drawing Sheets

(51) Int. Cl.
*H04B 17/345* (2015.01)
*H04B 17/382* (2015.01)

(58) Field of Classification Search
CPC ..... H04W 36/30; H04W 16/12; H04W 24/00; H04W 28/08; H04W 80/04; H04W 28/04
USPC ............ 455/63.1, 67.13, 436–444, 450–453; 370/310, 328, 331–334
See application file for complete search history.

(56) References Cited

U.S. PATENT DOCUMENTS

| | | | |
|---|---|---|---|
| 6,498,934 B1 | 12/2002 | Muller | |
| 6,636,736 B1 | 10/2003 | Billon | |
| 6,671,516 B1* | 12/2003 | Doi | 455/509 |
| 6,993,342 B2 | 1/2006 | Kuchibhotla et al. | |
| 7,636,334 B2 | 12/2009 | Gerlach | |
| 7,680,457 B2 | 3/2010 | Jin et al. | |
| 2001/0053695 A1 | 12/2001 | Wallentin | |
| 2003/0013451 A1 | 1/2003 | Walton | |
| 2003/0096618 A1 | 5/2003 | Palenius | |
| 2003/0123425 A1 | 7/2003 | Walton et al. | |
| 2003/0128658 A1 | 7/2003 | Walton et al. | |
| 2004/0062193 A1 | 4/2004 | Ma et al. | |
| 2004/0100897 A1 | 5/2004 | Shattil | |
| 2005/0002369 A1 | 1/2005 | Ro et al. | |
| 2005/0009532 A1 | 1/2005 | Cuffaro et al. | |
| 2005/0025039 A1 | 2/2005 | Hwang et al. | |
| 2005/0025040 A1 | 2/2005 | Tang et al. | |
| 2005/0031047 A1 | 2/2005 | Maltsev et al. | |
| 2005/0096061 A1 | 5/2005 | Ji et al. | |
| 2005/0099937 A1 | 5/2005 | Oh et al. | |
| 2005/0157639 A1 | 7/2005 | Song et al. | |
| 2006/0019701 A1 | 1/2006 | Ji | |
| 2006/0153060 A1 | 7/2006 | Cho | |
| 2006/0205412 A1 | 9/2006 | Oh et al. | |
| 2006/0251041 A1 | 11/2006 | Pajukoski et al. | |
| 2007/0171809 A1 | 7/2007 | Pajukoski et al. | |
| 2007/0297323 A1 | 12/2007 | Seki | |
| 2008/0039129 A1 | 2/2008 | Li et al. | |
| 2008/0132242 A1 | 6/2008 | Hamalainen et al. | |

FOREIGN PATENT DOCUMENTS

| | | |
|---|---|---|
| EP | 1014640 A2 | 6/2000 |
| EP | 1 339 245 A1 | 8/2003 |
| EP | 1526674 A1 | 4/2005 |
| EP | 1538802 A2 | 6/2005 |
| EP | 1566918 A1 | 8/2005 |
| EP | 1 578 159 A1 | 9/2005 |
| EP | 1 589 776 A1 | 10/2005 |
| EP | 1603356 A2 | 12/2005 |
| EP | 1653694 A2 | 5/2006 |
| GB | 2 285 900 A | 7/1995 |
| WO | 2002/049305 A2 | 6/2002 |
| WO | 2002/067617 A1 | 8/2002 |
| WO | 2005/020613 A2 | 3/2005 |
| WO | 2005/101882 A1 | 10/2005 |
| WO | WO 2007/107207 A1 | 9/2007 |

OTHER PUBLICATIONS

Nokia Corporation, "System level performance of UL SC-FDMA", 3GPP TSG RAN WG1 Meeting #43, Seoul, Korea, Nov. 7-11, 2005, a total of 4 pages.
Andrea Baiocchi, Alfredo Todini, Andrea Valletta; "Autonomous Optimized Interference Management of CDMA Cellular Access with Multichannel", 14th IST Mobile and Wireless Communications Summit, Dresden, Germany, Jun. 19-22, 2005.
International Search Report, PCT/FI2007/0505593, filed Nov. 5, 2007.
Korean Office Action application No. 10-2009-7002431 dated Aug. 13, 2010.
Chinese Office Action application No. 200780030970.4 dated Oct. 6, 2010.
Chinese Office Action, dated Aug. 3, 2011, in a corresponding application.
Chinese Office Action (second), dated May 12, 2011, and English translation.
Chinese Office Action in Chinese Application No. 200780030970.4, dated Apr. 1, 2012.
International Search Report and Written Opinion received for corresponding Patent Corporation Treaty Application No. PCT/FI2006/050324, dated Mar. 23, 2007, 11 Pages.
International Search Report and Written Opinion received for corresponding Patent Corporation Treaty Application No. PCT/FI2007/050010, dated Apr. 17, 2007, 10 Pages.
Office Action received for corresponding Russian Patent Application No. 2009103985, dated Jan. 19, 2010, 7 Pages of Office Action and 4 pages of English Translation.
"UL Reference Signal Structure for E-UTRA", 3GPP TSG RAN WG1 #47, R1-063368, Nokia, Agenda item: 6.4.2, Riga, Latvia, Nov. 6-10, 2006, 4 pages.
"Orthogonal Multiplexing of L1/L2 Control Signals with UL Data", 3GPP TSG RAN WG1 #47, R1-063381, Nokia, Agenda item: 6.12.1, Riga, Latvia, Nov. 6-10, 2006, 2 pages.
"Multiplexing of L1/L2 Control Signaling when UE has not data to transmit", 3GPP TSG RAN WG1 #47, R1-63380, Nokia, Agenda item: 6.12.1, Riga, Latvia, Nov. 6-10, 2006, 6 pages.
"CDM Multiplexing of Synchronous RACH", 3GPP TSG RAN WG1 #47, R1-063361, Nokia, Agenda item: 6.3.1, Riga, Latvia, Nov. 6-10, 2006, 5 pages.
Office Action received for corresponding Japanese Patent Application No. 2008-509463, dated Jun. 14, 2010, 2 Pages of Office Action and 4 pages of English Translation.
Office Action received for corresponding Korean Patent Application No. 2007-7024384, dated Aug. 10, 2009, 3 Pages of Office Action and 2 pages of English Translation.
Office Action received for corresponding Korean Patent Application No. 2007-7024384, dated Jan. 13, 2010, 3 Pages of Office Action and 2 pages of English Translation.
Office Action received for corresponding Malaysian Patent Application No. PI120061872, dated Feb. 20, 2009, 3 pages.
International Search Report and Written Opinion received for corresponding Patent Corporation Treaty Application No. PCT/FI2006/050179, dated Aug. 1, 2006, 10 Pages.
"Analysis of Inter-cell Power Control for Interference Management in E-UTRA UL", 3GPP TSG-RAN WG1 #46bis, R1-062705, Seoul, Korea, Agenda item: 6.8, Oct. 9-13, 2006, 17 pages.
"ACK/NACK Coverage in the Absence of UL Data", 3GPP TSG RAN WG1 #47, R1-063382, Nokia, Agenda item: 6.12.1, Riga, Latvia, Nov. 6-10, 2006, 4 pages.
International Search Report and Written Opinion received for corresponding Patent Corporation Treaty Application No. PCT/FI2006/050177, dated Aug. 1, 2006, 11 Pages.
Chang et al. "Power Control, Adaptive Modulation and Subchannel Allocation for multiuser downlink OFDM", IEEE 60th Vehicular Technology conference, VTC2004-Fall, Sep. 26-29, 2004, Los Angeles CA, USA, pp. 764-768.
Office Action received for corresponding Malaysian Patent Application No. PI20061352, dated May 8, 2009, 4 pages.
"Power Control and FDM Resource Allocation for E-UTRA Uplink and TP", 3GPP TSG RAN1#43 Ad Hoc, R1-060026, Motorola, Agenda Item: 5.2.3.4, Helsinki, Finland, Jan. 23-25, 2006, 5 Pages.
Office Action received for corresponding Taiwanese Patent Application No. 95115685, dated Feb. 1, 2010, 2 Pages.
3GPP Technical Report 25.814 V7.1.0, 3rd Generation Partnership Project; Technical Specification Group Radio Access Network; Physical layer aspects for evolved Universal Terrestrial Radio Access (UTRA), Release 7), Sep. 2006, 132 pages.
International Preliminary Report on Patentability received for corresponding Patent Corporation Treaty Application No. PCT/FI2006/050324, dated Jan. 13, 2009, 8 Pages.
International Preliminary Report on Patentability received for corresponding Patent Corporation Treaty Application No. PCT/FI2007/050010, dated Jan. 13, 2009, 7 Pages.

(56) References Cited

OTHER PUBLICATIONS

International Preliminary Report on Patentability received for corresponding Patent Corporation Treaty Application No. PCT/FI2006/050177, dated Nov. 6, 2007, 9 Pages.
International Preliminary Report on Patentability received for corresponding Patent Corporation Treaty Application No. PCT/FI2007/050593, dated May 12, 2009, 9 Pages.
International Preliminary Report on Patentability received for corresponding Patent Corporation Treaty Application No. PCT/FI2006/050179, dated Nov. 6, 2007, 8 Pages.
Office Action received for corresponding U.S. Appl. No. 11/362,706, dated Nov. 13, 2008, 18 Pages.
Office Action received for corresponding U.S. Appl. No. 11/362,706, dated Mar. 31, 2010, 14 Pages.
Office Action received for corresponding U.S. Appl. No. 11/396,538, dated Sep. 26, 2008, 20 Pages.
Office Action received for corresponding U.S. Appl. No. 11/396,538, dated Mar. 19, 2009, 14 Pages.
Office Action received for corresponding U.S. Appl. No. 11/396,538, dated Sep. 14, 2009, 13 Pages.
Office Action received for corresponding U.S. Appl. No. 11/396,538, dated Apr. 13, 2010, 15 Pages.
Office Action received for corresponding U.S. Appl. No. 11/362,706, dated Oct. 1, 2009, 12 Pages.
Office Action received for corresponding U.S. Appl. No. 11/362,706, dated May 11, 2009, 13 Pages.
Office Action received for corresponding Chinese Patent Application No. 200780030970.4, dated Sep. 6, 2010, 4 Pages.
Office Action received for corresponding Chinese Patent Application No. 200680015507.8, dated Sep. 3, 2010, 3 Pages.
Weimin Xiao et al., "Uplink Power Control, Interference Coordination and Resource Allocation for 3GPP E-UTRA", 2006 IEEE 64th Vehicular Technology Conference: VTC 2006-Fall; Sep. 25-28, 2006, Montreal, Quebec, Canada, Piscataway, NJ: IEEE Operations Center, Sep. 1, 2006, pp. 1-5, XP031051216.
Search Report dated Apr. 24, 2013 for corresponding EP Patent Application No. 07 82 3230.
European Office Action dated Dec. 18, 2017, issued in corresponding EP Application No. 07823230.3.

* cited by examiner

RADIO RESOURCE ALLOCATION AND RADIO SYSTEM

FIELD

The invention relates to a radio resource allocation method, to a radio system, to a network element, to a network element module, and to a computer-readable distribution medium encoding a computer program of instructions for executing a computer process for radio resource allocation.

BACKGROUND

The future 3G LTE (Long Term Evolution) systems represent a revolutionary path of future's cellular systems based on 3GPP standards. It is presumed that LTE will have both a new radio access scheme and a new radio access network (RAN) architecture. SC-FDMA (single carrier frequency division multiple access) technique is among the most probable radio access technologies for 3G uplink (UL). The performance of SC-FDMA is not limited by the own cell interference since the system is designed to be orthogonal. On the contrary, the coverage area in orthogonal systems like OFDMA (orthogonal FDMA) or SC-FDMA is typically limited by the other cell interference.

A traditional way to reduce the amount of other cell interference is to use frequency reuse. Frequency reuse is used, for example, in GSM (global system for mobile communications)/EDGE (enhanced data rates for global evolution) systems. A problem with the frequency reuse is that it wastes the capacity of the network. Another possibility is to utilize processing gain by spectrum spreading and channel coding. This approach is widely used in 3G systems. Network capacity in 3G systems is limited by the other cell and own cell interference.

For example, 3.9G is a challenging system since the working assumption is frequency reuse 1 and at the same time significantly improved system performance in terms of average throughput (per Hz) and cell edge throughput is targeted. Interference control (IC) may be needed for fulfilling the tight performance requirements of 3.9G systems. The IC controls the radio resources by applying some restrictions to the resource management. Such restrictions in a cell will provide the possibility for improvement in SINR and cell edge data rates on the corresponding resources in neighboring cell(s).

Examples of interference control schemes for 3.9G uplink of 3GPP are described in "Uplink Interference Control Considerations, R1-050813", RAN WG1 #42 and in "System level performance of UL SC-FDMA, R1-051411", RAN WG1 #43.

The interference control in 3.9G uplink is of great importance. Since the exchange of physical layer information between base stations is expected to be limited, methods that rely on (beforehand) fixed principles are attractive. One such method is the user grouping principle where users in separate cells are allocated to the same frequency-time slots (reuse factor between cells is 1) according to their reported path losses. It is noted that the term 'path loss' has a loose meaning since the antenna gains are included in it. Hence, although physical signal paths between user terminal and transmitter antennas of adjacent cells are almost the same, the measured 'path losses' with respect to adjacent cells may greatly vary since base station transmit antenna gains with respect to adjacent cells are not the same. Further, the term 'adjacent cell' is used loosely here since it is referred to all cells for which mutual control between cells is possible. This is the case when a single base station operates a site that supports multiple sectors each having their own logical cells.

FIG. 1 shows an illustrative example of a grouping principle where frequency-time resources are divided into frequency-time resource groups in a plurality of cells 120, 122, 124 of a radio system. The plurality of cells 120, 122, and 124 may be adjacent cells but the frequency band division and radio resource allocation may also be applied to isolated cells. As illustrated in FIG. 1, the frequency band 140 division into frequency-time resource groups 130, 132, 134 may be carried out in substantially the same manner in the plurality of cells 120, 122, 124 of the radio system. User terminals within the coverage area of a plurality of adjacent cells 120, 122, 124 may be allocated to the frequency-time resource groups in a similar manner for each cell on the basis of the modulation and coding schemes used by the user terminals and/or power levels or path loss values associated with the transmitted signals of the user terminals. Thus, user terminals with substantially the same characteristics (modulation and coding and/or power levels or path loss values, for example) are usually allocated to the same or adjacent frequency-time resource group in the plurality of adjacent cells.

FIG. 2 shows a simplified illustrative example where user terminals 100-105 of cells 1-3 admit round the same path losses 200-205. The path loss quantization may vary depending on the number of user terminals. According to prior art, user terminals 100-105 are allocated to the same, for example to the first, time slot in a frame. The problem is, however, that the interference between sectors (or adjacent cells) is not taken into account. Thus, the user terminals 100 and 101, as well as the user terminals 102 and 103, and 104 and 105, are using the same frequency-time resources and interference between the sectors can become a factor that limits the achievable data rate in an area where the user terminals are close to the border of cells of the same base station. Therefore, there is a need to improve radio resource allocation processes.

BRIEF DESCRIPTION OF THE INVENTION

An object of the invention is to provide an improved method, an improved apparatus, an improved network element, an improved network element module and an improved computer-readable distribution medium. According to an aspect of the invention, there is provided a method comprising: detecting cell measurement data with respect to an own cell and adjacent cells of each user terminal of a plurality of cells of the radio system; comparing resulting interference values of different user terminal combinations within the same frequency-time resource group of the radio system on the basis of the cell measurement data, the frequency-time resource group including user terminals of more than one cell; and controlling resource allocation in at least part of the frequency-time resource groups on the basis of the comparison.

According to another aspect of the invention, there is provided an apparatus comprising: a calculation unit configured to compare resulting interference values of different user terminal combinations within the same frequency-time resource group of the radio system on the basis of cell measurement data, the frequency-time resource group including user terminals of more than one cell; and a processing unit configured to control resource allocation in at least part of the frequency-time resource groups on the basis of the comparison.

According to another aspect of the invention, there is provided a network element of a radio system comprising: a receiver for receiving cell measurement data with respect to an own cell and adjacent cells of each user terminal of a plurality of cells of the radio system; a calculation unit for comparing resulting interference values of different user terminal combinations within the same frequency-time resource group of the radio system on the basis of the cell measurement data, the frequency-time resource group including user terminals of more than one cell; and a processing unit for controlling resource allocation in at least part of the frequency-time resource groups on the basis of the comparison.

According to another aspect of the invention, there is provided a network element module comprising: a calculation unit for comparing resulting interference values of different user terminal combinations within the same frequency-time resource group of the radio system on the basis of cell measurement data with respect to an own cell and adjacent cells of each user terminal of a plurality of cells of the radio system, the frequency-time resource group including user terminals of more than one cell; and a processing unit for controlling resource allocation in at least part of the frequency-time resource groups on the basis of the comparison.

According to another aspect of the invention, there is provided a computer-readable distribution medium encoding a computer program of instructions for executing a computer process for radio resource allocation. The computer process comprises: detecting cell measurement data with respect to an own cell and adjacent cells of each user terminal of a plurality of cells of the radio system; comparing resulting interference values of different user terminal combinations within the same frequency-time resource group of the radio system on the basis of the cell measurement data, the frequency-time resource group including user terminals of more than one cell; and controlling resource allocation in at least part of the frequency-time resource groups on the basis of the comparison.

According to another aspect of the invention, there is provided an apparatus comprising: calculation means for comparing resulting interference values of different user terminal combinations within the same frequency-time resource group of the radio system on the basis of cell measurement data, the frequency-time resource group including user terminals of more than one cell; and processing means for controlling resource allocation in at least part of the frequency-time resource groups on the basis of the comparison.

According to another aspect of the invention, there is provided a network element module comprising: calculation means for comparing resulting interference values of different user terminal combinations within the same frequency-time resource group of a radio system on the basis of cell measurement data with respect to an own cell and adjacent cells of each user terminal of a plurality of cells of the radio system, the frequency-time resource group including user terminals of more than one cell; and processing means for controlling resource allocation in at least part of the frequency-time resource groups on the basis of the comparison.

The invention provides several advantages.

Inter-sector interference is attenuated. Better peak data rate availability in heavy load conditions is achieved. Both own and adjacent cell measurement data is taken into account in resource allocation control.

LIST OF DRAWINGS

In the following, the invention will be described in greater detail with reference to the embodiments and the accompanying drawings, in which FIG. 1 shows an example of a grouping principle in a known radio system;

DESCRIPTION OF EMBODIMENTS

Figure 3:
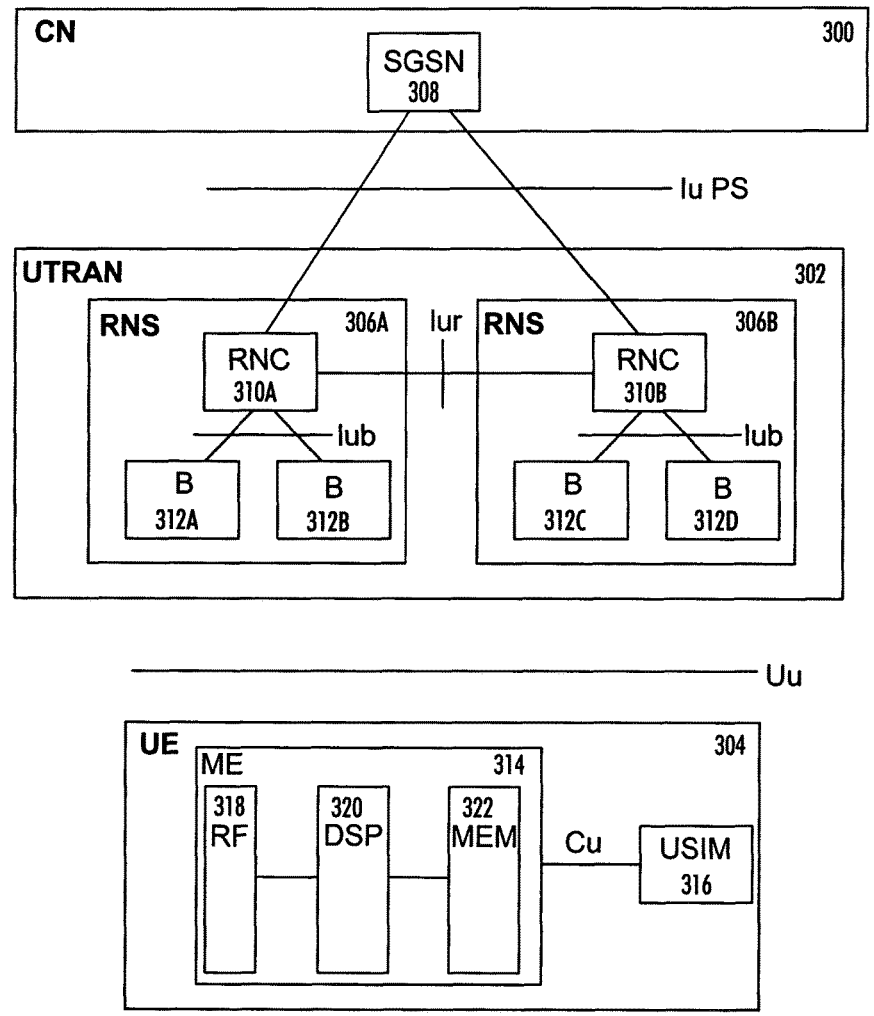
FIG. 3 shows an example of a radio system.

FIG. 3 illustrates an example of a radio system to which the present solution may be applied. Below, embodiments of the invention will be described using the UMTS (Universal Mobile Telecommunications System) as an example of the radio system. The invention may, however, be applied to other radio systems. The structure and functions of such a radio system and those of the associated network elements are only described when relevant to the invention.

The radio system may be divided into a core network (CN) 300, a UMTS terrestrial radio access network (UTRAN) 302, and a user terminal (UE) 304. The core network 300 and the UTRAN 302 compose a network infrastructure of the wireless telecommunications system.

The UTRAN 302 is typically implemented with wideband code division multiple access (WCDMA) radio access technology.

The core network 300 includes a serving GPRS support node (SGSN) 308 connected to the UTRAN 302 over an Iu PS interface. The SGSN 308 represents the center point of the packet-switched domain of the core network 100. The main task of the SGSN 308 is to transmit packets to the user terminal 304 and to receive packets from the user terminal 304 by using the UTRAN 302. The SGSN 308 may contain subscriber and location information related to the user terminal 304.

The UTRAN 302 includes radio network sub-systems (RNS) 306A, 306B, each of which includes at least one radio network controller (RNC) 310A, 310B and nodes B (or base stations) 312A, 312B, 312C, 312D.

Some functions of the radio network controller 310A, 310B may be implemented with a digital signal processor, memory, and computer programs for executing computer processes. The basic structure and operation of the radio network controller 310A, 310B are known to one skilled in the art and only the details relevant to the present solution are discussed in detail.

The node B 312A, 312B, 312C, 312D implements the Uu interface, through which the user terminal 304 may access the network infrastructure. Each node B 312A, 312B, 312C, 312D typically provides a communication link between the network infrastructure and user terminals within a determined coverage area known as a cell. The cell may be further divided into sectors. Some functions of the base station 312A, 312B, 312C, 312D may be implemented with a digital signal processor, memory, and computer programs for executing computer processes. The basic structure and operation of the base station 312A, 312B, 312C, 312D are known to one skilled in the art and only the details relevant to the present solution are discussed in detail.

The user terminal 304 may include two parts: mobile equipment (ME) 314 and a UMTS subscriber identity module (USIM) 316. The mobile equipment 314 typically includes radio frequency parts (RF) 318 for providing the Uu interface. The user terminal 304 further includes a digital signal processor 320, memory 322, and computer programs for executing computer processes. The user terminal 304 may further comprise an antenna, a user interface, and a battery not shown in FIG. 3. The USIM 316 comprises user-related information and information related to information security in particular, for instance, an encryption algorithm.

Figure 4:
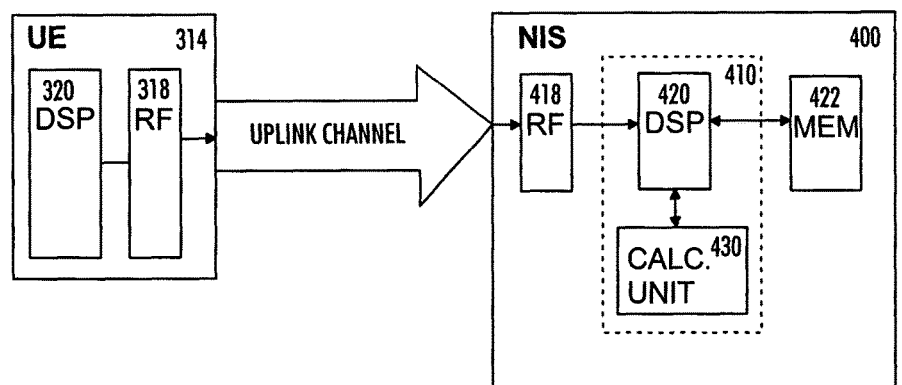
FIG. 4 shows another example of a radio system.

FIG. 4 shows another example of a radio system. The radio system comprises a network infrastructure (NIS) 400 and a user terminal (UE) 314. The user terminal 314 may be connected to the network infrastructure 400 over an uplink physical data channel, such as a DPDCH (Dedicated Physical Data channel) defined in the 3GPP specification. The channels used in communication between the user terminal 314 and the network infrastructure 400 can also be shared channels.

An uplink control channel, such as an uplink DPCCH (Dedicated Physical Control Channel) defined in the 3GPP (3rd Generation Partnership Project) specification, transmitted by the user terminal 314 includes pilot sequences. The network infrastructure 400 decodes the pilot sequences and estimates signal quality parameters, such as the power level of the received signal and SIR (Signal-to-Interference Ratio), of the uplink DPCCH.

The network infrastructure 400 comprises a transmitting/receiving unit 418, which carries out channel encoding of transmission signals, converts them from the baseband to the transmission frequency band and modulates and amplifies the transmission signals. The signal-processing unit DSP 420 controls the operation of the network element and evaluates signals received via the transmitting/receiving unit 418. Data about the transmission and switching times and specific characteristics of the connections are stored in a memory 422.

In FIG. 4, only one user terminal 314 is shown. However, it is assumed that there are several user terminals 314 that share a common frequency band for communicating with the network infrastructure 400. The user terminals 314 may be scattered throughout the coverage area of the network infrastructure 400, which may be divided into cells with each cell being associated with a Node B. The user terminals within a cell may be served by the Node B associated with the cell. If a user terminal resides at the edge of a cell, the user terminal may be served by one or more nodes B associated with adjacent cells.

The radio system may employ several data modulation schemes in order to transfer data between user terminals 314 and network infrastructure 400 with variable data rates. The cellular telecommunication system may employ, for example, quadrature phase shift keying (QPSK) and quadrature amplitude modulation (QAM) modulation schemes. Several coding schemes may also be implemented with different effective code rates (ECR). For example, when a communication link between a user terminal 314 and network infrastructure 400 is of low quality, strong coding may be used in order to ensure reliable data transfer. On the other hand, under a high quality communication link, lighter coding may be used to provide high data rate communications.

In the upcoming systems, such as in 3.9G systems, frequency division multiple access (FDMA) techniques where users are separated into different frequency bands can be used particularly for uplink communications. By employing FDMA properly for uplink communications, the interference-limited nature of the telecommunication system may be improved, if compared to the code division multiple access (CDMA) based uplink communications.

The user terminals 314 are allocated to frequency-time resource groups, for example, in the following way. In the following description, only one cell of a cellular telecommunication system is considered, but the embodiments of the invention may be advantageously used in a plurality of cells of the cellular telecommunication system The network infrastructure 400 measures the signals in the uplink direction. The resource request from the user terminal 314 is thus recognized, for example by a node B providing the communication services within the cell the user terminal is currently located in. The decision is made whether it is possible to allocate resources to the user terminal 314. If, for example, an adequate signal-to-noise ratio is detected, then the user terminal 314 is allocated a frequency band via an allocation channel. The resource request may be received when a user terminal 314 initiates communications with the network infrastructure or when the user terminal is moving from one cell to another and handover is considered. In the latter case, the user terminal may request radio resources from the node B of the cell in the direction of movement of the user terminal.

The radio resources allocation can be carried out in the network infrastructure 400, such as a network element (e.g. node B, Radio Network Controller, a server, a router unit, or an equivalent element of a cellular telecommunication network). The processing unit 420 is configured to divide the frequency band of each cell of the radio system independently into more than one frequency-time resource group and to allocate user terminals 314 within the coverage area of each cell to the frequency-time resource groups on the basis of the modulation and coding schemes used by the user terminals 314, for example.

In an embodiment, the user terminal 314 provides the network element 400 cell measurement data with respect to both own cell and adjacent cells of the user terminal. The receiving unit 418 receives the cell measurement data with respect to an own cell and adjacent cells of each user terminal of a plurality of cells of the radio system.

The network element 400 further comprises a network element module 410 including a calculation unit 430 for comparing resulting interference values of different user terminal combinations within the same frequency-time resource group of the radio system on the basis of the cell measurement data. The frequency-time resource group includes user terminals from more than one cell. Further, the processing unit 420 is configured to control resource allocation in at least part of the frequency-time resource groups on the basis of the comparison.

In an embodiment, the processing unit 420 is configured to minimize mutual interference between the user terminals of adjacent cells when allocating resources in at least part of the frequency-time resource groups.

In an embodiment, the calculation unit 430 is configured to use path loss information included in the cell measurement data of the user terminals of a user terminal combination when estimating the resulting interference value of the same user terminal combination.

In an embodiment, the calculation unit 430 is configured to use angular information included in the cell measurement data, the angular information relating to the angular differences between the user terminals of a user terminal combination, when estimating the resulting interference value of the same user terminal combination.

In an embodiment, the calculation unit 430 is configured to use information relating to received powers from adjacent base stations included in the cell measurement data of the user terminals of a user terminal combination when estimating the resulting interference value of the same user terminal combination.

In an embodiment, the calculation unit 430 is configured to detect user terminals having at least approximately the same path loss values with respect to the own cell and adjacent cells, and the processing unit is configured to control resource allocation in at least part of the frequency-time resource groups on the basis of the detection.

In an embodiment, the processing unit 420 is configured to perform the resource allocation control of only the user terminals having small path loss values in at least part of the frequency-time resource groups on the basis of the comparison.

In an embodiment, the calculation unit 430 is configured to form interference matrices corresponding to different user terminal combinations for comparing resulting interference values of different user terminal combinations within the same frequency-time resource group.

The embodiments of the invention can be used in orthogonal frequency division multiple access (OFDMA) and single carrier frequency division multiple access (SC-FDMA) systems, for example. Further, both the interleaved and the blocked type of OFDMA or SC-FDMA can be used inside the sub-blocks. When using the interleaved type of OFDMA, subcarriers of a plurality of user terminals allocated to the same sub-block are interleaved in the frequency domain without any two carriers occupying the same frequency band. When using the interleaved type of SC-FDMA, time-domain signal processing techniques are applied to a signal to be transmitted in a transmitting user terminal in order to produce a comb-shaped frequency spectrum to the signal to be transmitted. Frequency shift of the comb-shaped spectrum is carried out by applying a suitable phase rotation to the signal to be transmitted so that the spectrum of the transmitted signal will not occupy the same frequency components as a signal transmitted from another user terminal 314 allocated to the same frequency band sub-block. By applying this type of signal processing, a low peak-to-average power ratio can be achieved for the transmitted signal, which improves the efficiency of the amplifiers of the user terminals 314. The embodiments of the invention can be implemented by using radio frequency and baseband processing techniques known in the art.

Figure 5:
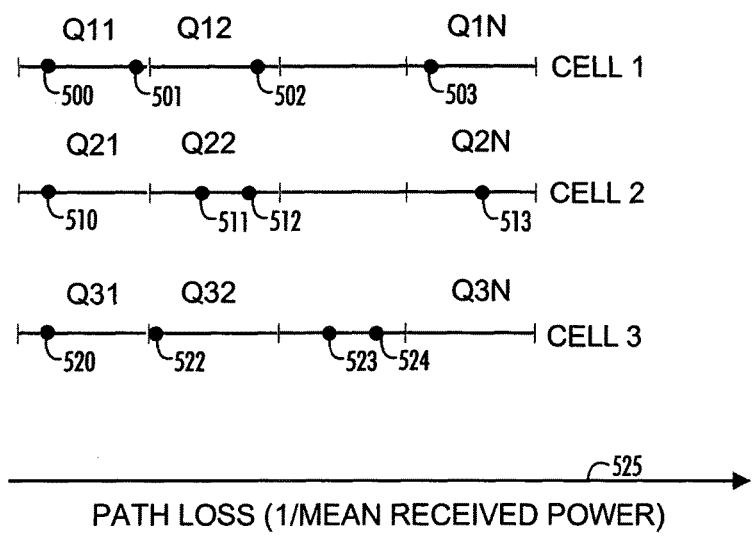
FIG. 5 illustrates an example of initial path loss quantization.

FIG. 5 illustrates an example of initial path loss quantization. First, consider a case where the user terminals monitor the received power from more than one cell. The obtained cell measurement information is signaled to the base station, for example, where it can be used as a basis for resource allocation. Initially, the user terminals within the same cell are divided into different groups Q11, Q12, Q1N, Q21, Q22, Q2N, Q31, Q32, Q3N, for example, according to their path losses 500-524, 525 with respect to the own cell. Following the prior art, frequency-time resources are given to different groups in a fixed and coordinated manner (e.g. the same mapping between resources and groups in different cells).

In an embodiment, the resource allocation is coordinated within a site that contains more than one cell but one base station. If, for example, there are three cells (CELL 1, CELL 2, CELL 3) in the site, then the resource allocation in the groups containing user terminals with approximately the same path loss values can be controlled. The coordinated resource allocation between the cells can be carried out by using at least one of: path loss information, information on received powers from adjacent base stations and angular information. The resource allocation control can be carried out only in part of the frequency-time resource groups, for example in the groups where path losses of the user terminals are 'small'.

Figure 6:
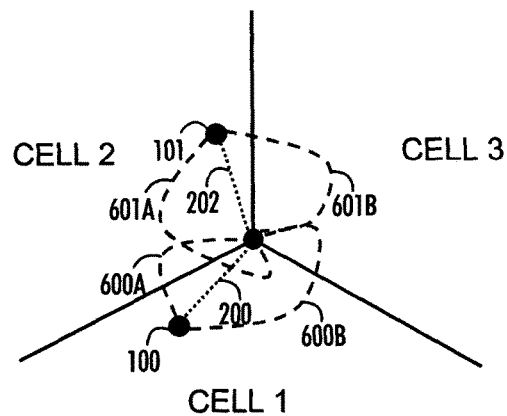
FIG. 6 illustrates an example of controlling radio resources according to an embodiment of the invention.

In the example of FIG. 6, path losses with respect to both own and adjacent cells for two user terminals 100, 101 are measured. The path loss information is available via handover measurements, for example. The dotted lines 200, 202 illustrate the measured path losses with respect to own cells, and the dashed lines 600A, 600B, 601A, 601B illustrate the measured path losses with respect to adjacent cells. When the cell measurement information is provided to the network infrastructure, a resulting interference from different user terminal combinations can be evaluated when the considered user terminals are from groups Q11, Q21 and Q31, for example. The target is to minimize the mutual interference between the user terminals (of adjacent cells) that are allocated into the same frequency-time resources. For this purpose, interference matrices corresponding to different user terminal combinations can be formed and various optimization method (with different object functions) can be applied.

Figure 1:
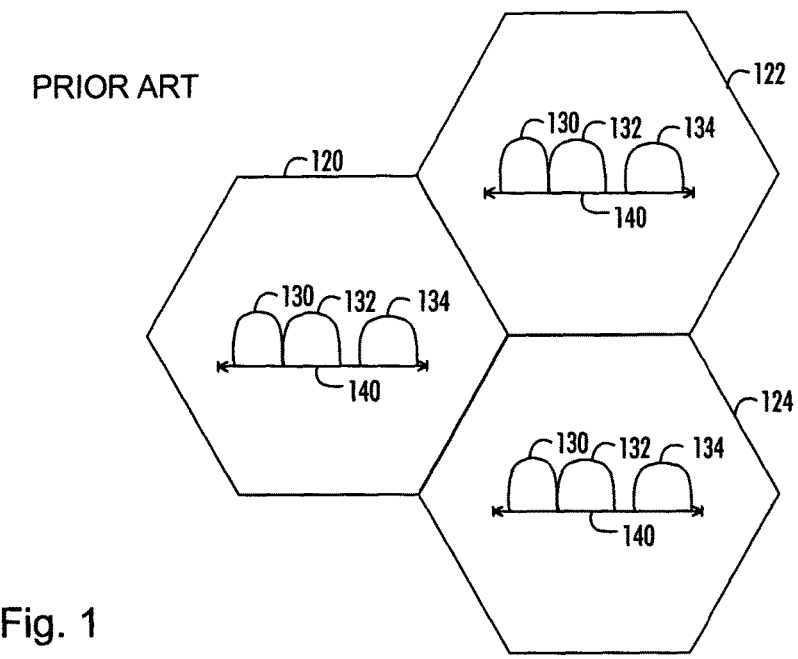
Figure 2:
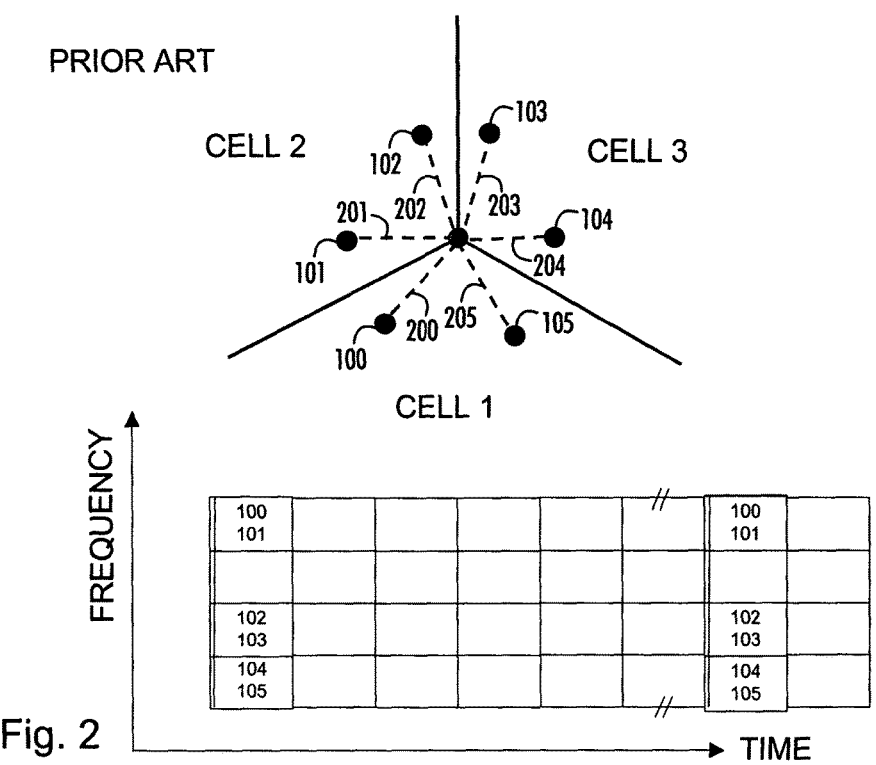
FIG. 2 illustrates an example of controlling radio resources in a known radio system.
Figure 7:
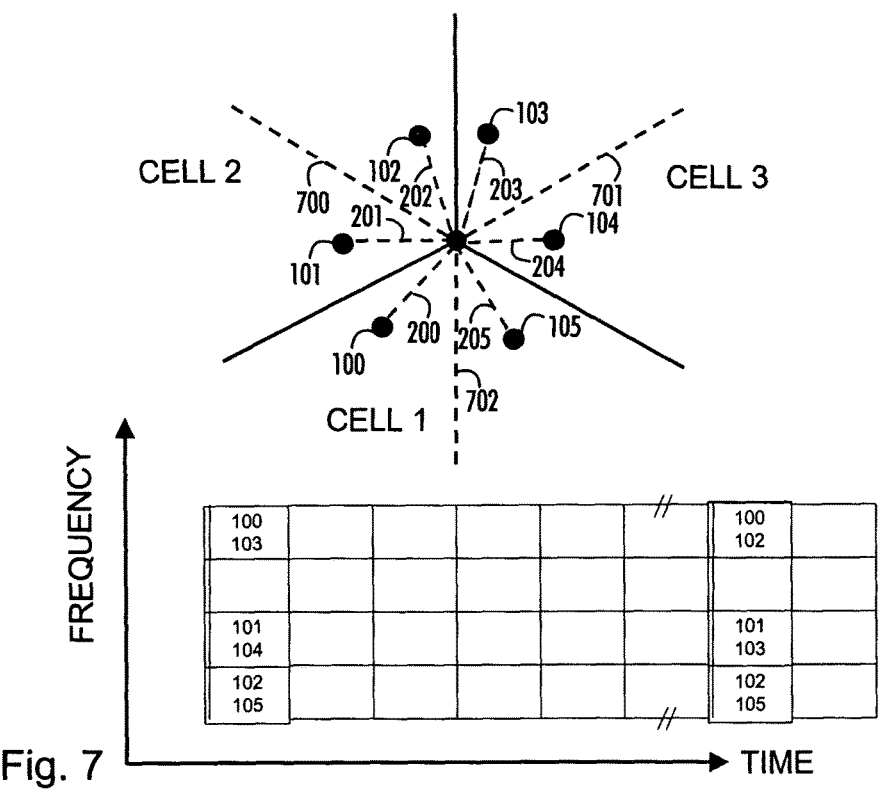
FIG. 7 illustrates another example of controlling radio resources according to an embodiment of the invention.

In addition to the path loss approach, also angular information can be used for finding suitable user terminal combinations. FIG. 7 is an illustrative example where the user terminals of FIG. 1 are allocated using both path loss and angular information. In FIG. 7, the user terminals 100 and 102 (as well as user terminals 101 and 103) are placed in the same frequency-time resource groups. Since the angular difference between the user terminals within the same frequency-time resource group is maximized, the mutual difference is lower than in the case of FIG. 1.

There are different options for obtaining the angular information. In an embodiment, there are more than three sectors—six sectors for example—and path loss information can be exchanged between the sectors. This case is illustrated in FIG. 7 by using additional dashed sector lines 700, 701 and 702. Beam-forming techniques can also be applied. Then the existing angular information can be used to coordinate the transmission both inside the sector and between the sectors. Further, distributed antennas/relays can be used. If a location (or at least a direction) of a distributed antenna/relay is known, then the angular/path loss information that can be used in grouping is provided.

The path loss measurements can be carried out in the user terminals by known means and this information is transmitted to the network infrastructure. The resource allocation in the network infrastructure is performed following a fixed principle that applies either the path loss data or angular information of both.

The initial grouping of user terminals according to path loss with respect to the own cell is explained above. For explaining the coordinated resource allocation according to an embodiment that is based on path loss information with respect to both own and adjacent cells, a following illustrative example is considered. Assume that there are user terminals 1 and 2 in group Q11, user terminal 3 in group Q21 and user terminal 4 in group Q31. Interference matrices $L_{134}$ and $L_{234}$ corresponding to user terminal combinations (here triplets) (1, 3, 4) and (2, 3, 4) are formed (also interference matrices corresponding to user terminal pairs (1, 3), (1, 4), . . . could be used):

$$L_{134} = \begin{pmatrix} L_{11} & L_{13} & L_{14} \\ L_{21} & L_{23} & L_{24} \\ L_{31} & L_{33} & L_{34} \end{pmatrix} \text{ and } L_{234} = \begin{pmatrix} L_{12} & L_{13} & L_{14} \\ L_{22} & L_{23} & L_{24} \\ L_{32} & L_{33} & L_{34} \end{pmatrix}.$$

Here the elements $L_{mk}$ refer to the measured path loss between the mth cell transmit antenna(s) and the kth user terminal. The better triplet may be selected, for example, based on products of eigenvalues. Hence, if $\lambda_{1234}^p$, and $\lambda_{234}^p$, p=1, 2, 3 are eigenvalues of $L_{134}$ and $L_{234}$ respectively, then the user terminals 1, 3 and 4 can be allocated into the same frequency-time resource group (in adjacent cells) if: $\lambda_{1234}^1 \cdot \lambda_{134}^2 \cdot \lambda_{134}^3 < \lambda_{234}^1 \cdot \lambda_{234}^2 \cdot \lambda_{234}^3$. Also other criteria can be used in resource allocation, for example determinants of matrices.

Figure 8:
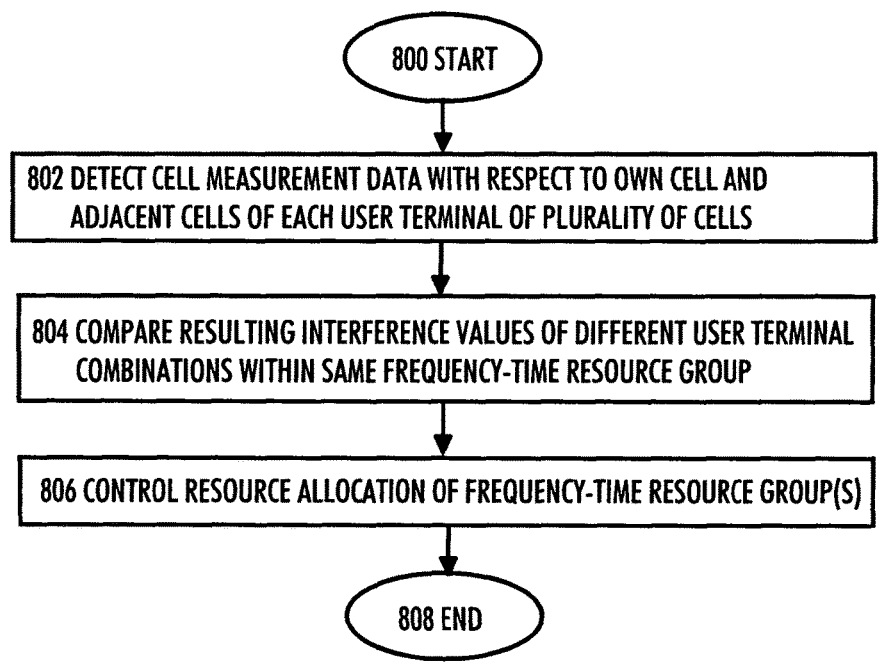
FIG. 8 illustrates an example of a radio resource allocation method according to an embodiment of the invention.

With reference to FIG. 8, examples of methodology according to embodiments of the invention are shown.

In FIG. 8, the method starts in 800. In 802, the cell measurement data with respect to own and adjacent cells of each user terminal of plurality of cells is detected. In 804, the resulting interference values of different user terminal combinations within the same frequency-time resource group are compared. In 806, resource allocation of frequency-time resource group(s) is controlled. The resource allocation may be based on path loss information included in the cell measurement data. In addition to the path loss information of the user terminals, the allocation may also be made on the basis of power levels and/or angular information.

The method ends in 808.

The embodiments of the invention may be realized in a network element of a network infrastructure of a radio system. The network element may comprise a processing unit configured to perform at least some of the steps described in connection with the flowchart of FIG. 8 and in connection with FIGS. 6, and 7. The embodiments may be implemented as a computer program comprising instructions for executing a computer process for radio resource allocation in uplink of a radio system. The computer program may be executed in the digital signal processor 420 of the network element 400. Some process steps may be executed in the digital signal processor of the node B 312A to 312D. Some process steps may be executed, depending on the embodiment, in the digital signal processor of the radio network controller 310A, 310B. Alternatively or additionally, some process steps may be executed in other elements (such as servers, routers, etc.) of the radio system.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method comprising:
detecting cell measurement data with respect to an own cell and adjacent cells of at least two user terminals of a plurality of cells of a radio system;
dividing a frequency band of each of the cells of the radio system into frequency-time resource groups and allocating the frequency-time resource groups to the at least two user terminals within a coverage area of each of the cells based on modulation and coding schemes used by the at least two user terminals;
comparing resulting interference values of different user terminal combinations with user terminals of more than one cell allocated with the same frequency-time resource group of the radio system on the basis of the cell measurement data,
wherein at least one of the user terminal combinations comprises two or more user terminals;
controlling resource allocation in at least part of the frequency-time resource groups on the basis of the comparison;
minimizing mutual interference between the user terminals of the adjacent cells when allocating resources in at least part of the frequency-time resource groups;
using path loss information included in the cell measurement data of the user terminals of a user terminal combination when estimating a resulting interference value of the same user terminal combination; and
using angular information included in the cell measurement data, the angular information relating to the angular differences between the user terminals of a user terminal combination, when estimating a resulting interference value of the same user terminal combination.

2. The method of claim 1, further comprising:
performing the resource allocation control by using at least one of the path loss information and the angular information.

3. The method of claim 1, further comprising:
using information relating to received powers from adjacent base stations included in the cell measurement data of the user terminals of a user terminal combination when estimating a resulting interference value of the same user terminal combination.

4. The method of claim 1, further comprising:
detecting user terminals having at least approximately the same path loss values with respect to the own cell and the adjacent cells, and controlling the resource allocation in at least part of the frequency-time resource groups on the basis of the detection.

5. The method of claim 1, further comprising:
performing the resource allocation control of only the user terminals having least path loss values in at least part of the frequency-time resource groups on the basis of the comparison.

6. The method of claim 1, further comprising:
forming interference matrices corresponding to different user terminal combinations for comparing resulting interference values of different user terminal combinations within the same frequency-time resource group.

7. An apparatus comprising:
a processing unit configured to
divide a frequency band of each of a plurality of cells of a radio system into frequency-time resource groups and allocate the frequency-time resource groups to at least two user terminals within a coverage area of each of the cells based on modulation and coding schemes used by the at least two user terminals;
compare resulting interference values of different user terminal combinations with user terminals of more than one cell allocated with the same frequency-time resource group of the radio system on the basis of cell measurement data, wherein at least one of the user terminal combinations comprises two or more user terminals;
control resource allocation in at least part of the frequency-time resource groups on the basis of the comparison;
minimize mutual interference between the user terminals of adjacent cells when allocating resources in at least part of the frequency-time resource groups;
use path loss information included in the cell measurement data of the user terminals of a user terminal combination when estimating a resulting interference value of the same user terminal combination; and
use angular information included in the cell measurement data, the angular information relating to the angular differences between the user terminals of a user terminal combination, when estimating a resulting interference value of the same user terminal combination.

8. The apparatus of claim 7, wherein the processing unit is configured to perform the resource allocation control by using at least one of the path loss information and the angular information.

9. The apparatus of claim 7, wherein the processing unit is configured to use information relating to received powers from adjacent base stations included in the cell measurement data of the user terminals of a user terminal combination when estimating a resulting interference value of the same user terminal combination.

10. The apparatus of claim 7, wherein the processing unit is configured to detect user terminals having at least approximately the same path loss values with respect to own cell and adjacent cells, and the processing unit is configured to control the resource allocation in at least part of the frequency-time resource groups on the basis of the detection.

11. The apparatus of claim 7, wherein the processing unit is configured to perform the resource allocation control on only the user terminals having least path loss values in at least part of the frequency-time resource groups on the basis of the comparison.

12. The apparatus of claim 7, wherein the processing unit is configured to form interference matrices corresponding to different user terminal combinations for comparing resulting interference values of different user terminal combinations within the same frequency-time resource group.

13. The apparatus of claim 7, further comprising a receiver configured to receive the cell measurement data with respect to an own cell and adjacent cells of each user terminal of a plurality of cells of the radio system.

14. The apparatus of claim 7, wherein the apparatus comprises a network element of a radio system.

15. The apparatus of claim 7, wherein the apparatus comprises a network element module.

16. A tangible and non-transitory computer-readable distribution medium encoding a computer program of instructions for executing a computer process for radio resource allocation, the computer process comprising:
detecting cell measurement data with respect to an own cell and adjacent cells of at least two user terminals of a plurality of cells of a radio system;
dividing a frequency band of each of the cells of the radio system into frequency-time resource groups and allocating the frequency-time resource groups to the at least two user terminals within a coverage area of each of the cells based on modulation and coding schemes used by the at least two user terminals;
comparing resulting interference values of different user terminal combinations with user terminals of more than one cell allocated with the same frequency-time resource group of the radio system on the basis of the cell measurement data, wherein at least one of the user terminal combinations comprises two or more user terminals;
controlling resource allocation in at least part of the frequency-time resource groups on the basis of the comparison;
minimizing mutual interference between the user terminals of the adjacent cells when allocating resources in at least part of the frequency-time resource groups;
using path loss information included in the cell measurement data of the user terminals of a user terminal combination when estimating a resulting interference value of the same user terminal combination; and
using angular information included in the cell measurement data, the angular information relating to the angular differences between the user terminals of a user terminal combination, when estimating a resulting interference value of the same user terminal combination.

17. The computer-readable distribution medium of claim 16, further comprising: performing the resource allocation control by using at least one of path loss information and angular information included in the cell measurement data.

18. An apparatus comprising:
at least one processor; and
at least one memory including computer program code;
the at least one memory and the computer program code configured, with the at least one processor, to cause the apparatus at least to
detect cell measurement data with respect to an own cell and adjacent cells of at least two user terminals of a plurality of cells of a radio system;
divide a frequency band of each of the cells of the radio system into frequency-time resource groups;
allocate the frequency-time resource groups to the at least two user terminals within a coverage area of each of the cells based on modulation and coding schemes used by the at least two user terminals;
compare resulting interference values of different user terminal combinations with user terminals of more than one cell allocated with the same frequency-time resource group of the radio system on the basis of cell measurement data, wherein at least one of the user terminal combinations comprises two or more user terminals;
control resource allocation in at least part of the frequency-time resource groups on the basis of the comparison;

minimize mutual interference between the user terminals of adjacent cells when allocating resources in at least part of the frequency-time resource groups; and use path loss information included in the cell measurement data of the user terminals of a user terminal combination when estimating a resulting interference value of the same user terminal combination; and use angular information included in the cell measurement data, the angular information relating to the angular differences between the user terminals of a user terminal combination, when estimating a resulting interference value of the same user terminal combination.

19. The apparatus of claim 18, wherein the at least one memory and the computer program code are further configured, with the at least one processor, to cause the apparatus at least to receive the cell measurement data with respect to an own cell and adjacent cells of each user terminal of a plurality of cells of the radio system.

* * * * *